US007888920B2

United States Patent
Chen et al.

(10) Patent No.: US 7,888,920 B2
(45) Date of Patent: Feb. 15, 2011

(54) POWER SUPPLY DEVICE WITH FAST OUTPUT VOLTAGE SWITCHING CAPABILITY

(75) Inventors: Ke-Horng Chen, Taipei County (TW); Chun-Yu Hsieh, Taichung (TW); Shih-Meng Chang, Taipei County (TW); Chia-Lin Liu, Tai-Chung Hsien (TW); Chi-Neng Mo, Tao-Yuan Hsien (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 1 day.

(21) Appl. No.: 12/357,399

(22) Filed: Jan. 22, 2009

(65) Prior Publication Data

US 2010/0127672 A1 May 27, 2010

(30) Foreign Application Priority Data

Nov. 21, 2008 (TW) .............................. 97145136 A

(51) Int. Cl.
G05F 1/00 (2006.01)
(52) U.S. Cl. ...................................... 323/271; 323/283
(58) Field of Classification Search ......... 323/282–284, 323/222, 224, 266, 268, 271
See application file for complete search history.

(56) References Cited

U.S. PATENT DOCUMENTS

| 4,100,540 | A  | * | 7/1978  | Fujita et al.  | 345/52  |
| 6,937,487 | B1 | * | 8/2005  | Bron           | 363/60  |
| 7,605,809 | B2 | * | 10/2009 | Wey et al.     | 345/212 |
| 2009/0102293 | A1 | * | 4/2009 | Hsieh          | 307/109 |

* cited by examiner

Primary Examiner—Adolf Berhane
Assistant Examiner—Emily Pham
(74) Attorney, Agent, or Firm—Winston Hsu; Scott Margo

(57) ABSTRACT

A power supply device is disclosed in the present invention, which includes a DC-DC boost converter and a charge recycling circuit. The DC-DC boost converter is utilized for boosting an input voltage to generate an output voltage, and adjusting a voltage level of the output voltage according to a level switching signal. The charge recycling circuit is electrically connected to the DC-DC boost converter, and is utilized for generating a current path according to the level switching signal to recycle redundant charges from the DC-DC boost converter when the output voltage is switched from high to low and to return stored charges back to the DC-DC boost converter when the output voltage is switched from low to high, so as to accelerate voltage switching of the output voltage and to reduce power consumption of the DC-DC boost converter.

12 Claims, 6 Drawing Sheets

US 7,888,920 B2

POWER SUPPLY DEVICE WITH FAST OUTPUT VOLTAGE SWITCHING CAPABILITY

BACKGROUND OF THE INVENTION

1. Field of the Invention

The present invention relates to a power supply device with fast output voltage switching capability, and more particularly, to a power supply device with fast output voltage switching capability and lower power consumption.

2. Description of the Prior Art

For reducing production cost, few voltage supplies are employed in electronic devices. Thus, when the circuit is in need of various DC voltages, a DC-DC converter is used to perform such voltage conversions, so the number of external components and integrated circuits can be saved.

Please refer to FIG. 1. FIG. 1 is a schematic diagram of a conventional DC-DC boost converter 10. In order to make an output voltage $V_{OUT}$ stable, the DC-DC boost converter 10 generally utilizes a Pulse Width Modulation (PWM) controller 11 to generate a switch signal that controls a duty cycle of a power transistor 102 for increasing or decreasing energy delivered to load elements. Detailed operations of the DC-DC boost converter 10 is well known by those skilled in the art, and thus not described particularly herein. In the prior art, when the output voltage $V_{OUT}$ is switched from high to low, the DC-DC boost converter 10 may temporarily cease operation of the PWM controller 11 such as by disabling the switch signal, for example, to allow a load current $I_{load}$ extracting charges from a load capacitor $C_L$, so as to level down the output voltage $V_{OUT}$. Until the output voltage $V_{OUT}$ descends to a target level, the operation of the PWM controller 11 is then resumed.

In such a case, the descending speed of the output voltage $V_{OUT}$ would be affected by sizes of the load capacitor $C_L$. Moreover, a great amount of energy may be unnecessarily consumed by the external circuits, especially for some specific applications of the DC-DC boost converter 10 that need to connect with large external capacitors such as an LED (Light Emit Diode) backlight module of a liquid crystal display (LCD), for example.

Besides, the prior art can further create additional current paths to accelerate voltage switching of the output voltage. For example, please refer to FIG. 2, which is a schematic diagram of a conventional DC-DC buck converter 20. In this case, when the output voltage $V_{OUT}$ is switched from high to low, the DC-DC buck converter 20 turns on a switch SL to allow charges of the load capacitor $C_L$ being directly transferred to the ground via an inductor L1, so the output voltage $V_{OUT}$ can be lowered rapidly. However, the way to directly transfer the charges of the load capacitor $C_L$ to the ground is kind of wasting of the energy. On the other hand, when the output voltage $V_{OUT}$ is switched from low to high, the DC-DC buck converter 20 then turns on a switch SH to allow an input voltage Vin directly charging the load capacitor $C_L$ via the inductor L1, so the output voltage $V_{OUT}$ can be raised rapidly. However, the way to raise the output voltage $V_{OUT}$ is not suitable for use when the output voltage $V_{OUT}$ is greater than the input voltage Vin, i.e., not suitable for the DC-DC boost converter.

Thus, even though the prior art can provide additional current paths to accelerate the voltage switching of the DC-DC converter, it may still suffer waste of energy, and cannot be applied to the DC-DC boost converter.

SUMMARY OF THE INVENTION

It is therefore an objective of the present invention to provide a power supply device with fast output voltage switching capability.

According to the present invention, a power supply device with fast output voltage switching capability is disclosed. The power supply device includes a DC-DC boost converter and a charge recycling circuit. The DC-DC boost converter is utilized for boosting an input voltage to generate an output voltage and for switching a voltage level of the output voltage according to a level switching signal. The charge recycling circuit is coupled to the DC-DC boost converter, and is utilized for generating a current path according to the level switching signal to recycle redundant charges from the DC-DC boost converter when the output voltage is switched from high to low and to return stored charges back to the DC-DC boost converter when the output voltage is switched from low to high, so as to accelerate voltage switching of the output voltage and to reduce power consumption of the DC-DC boost converter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
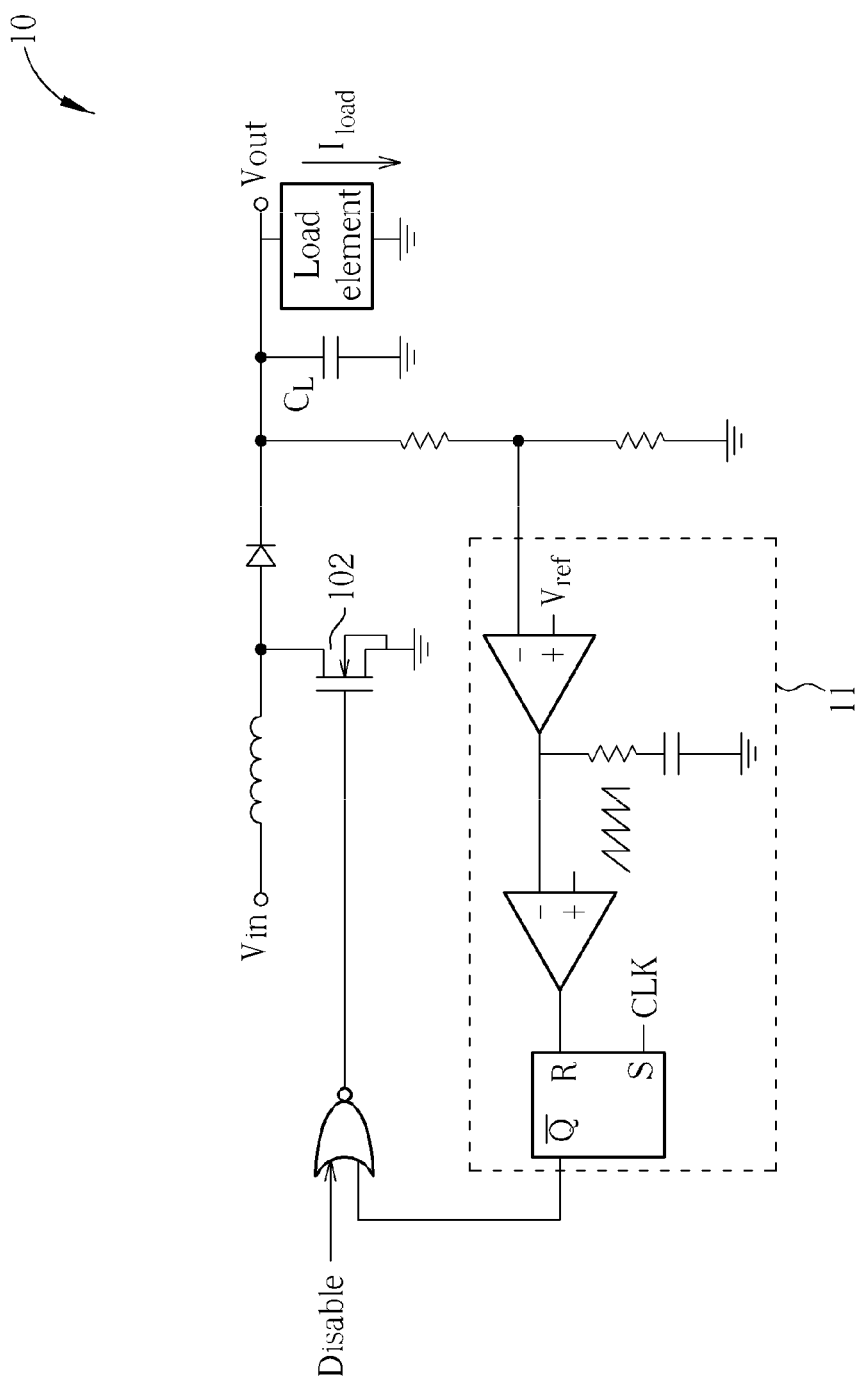
FIG. 1 is a schematic diagram of a conventional DC-DC boost converter.
Figure 2:
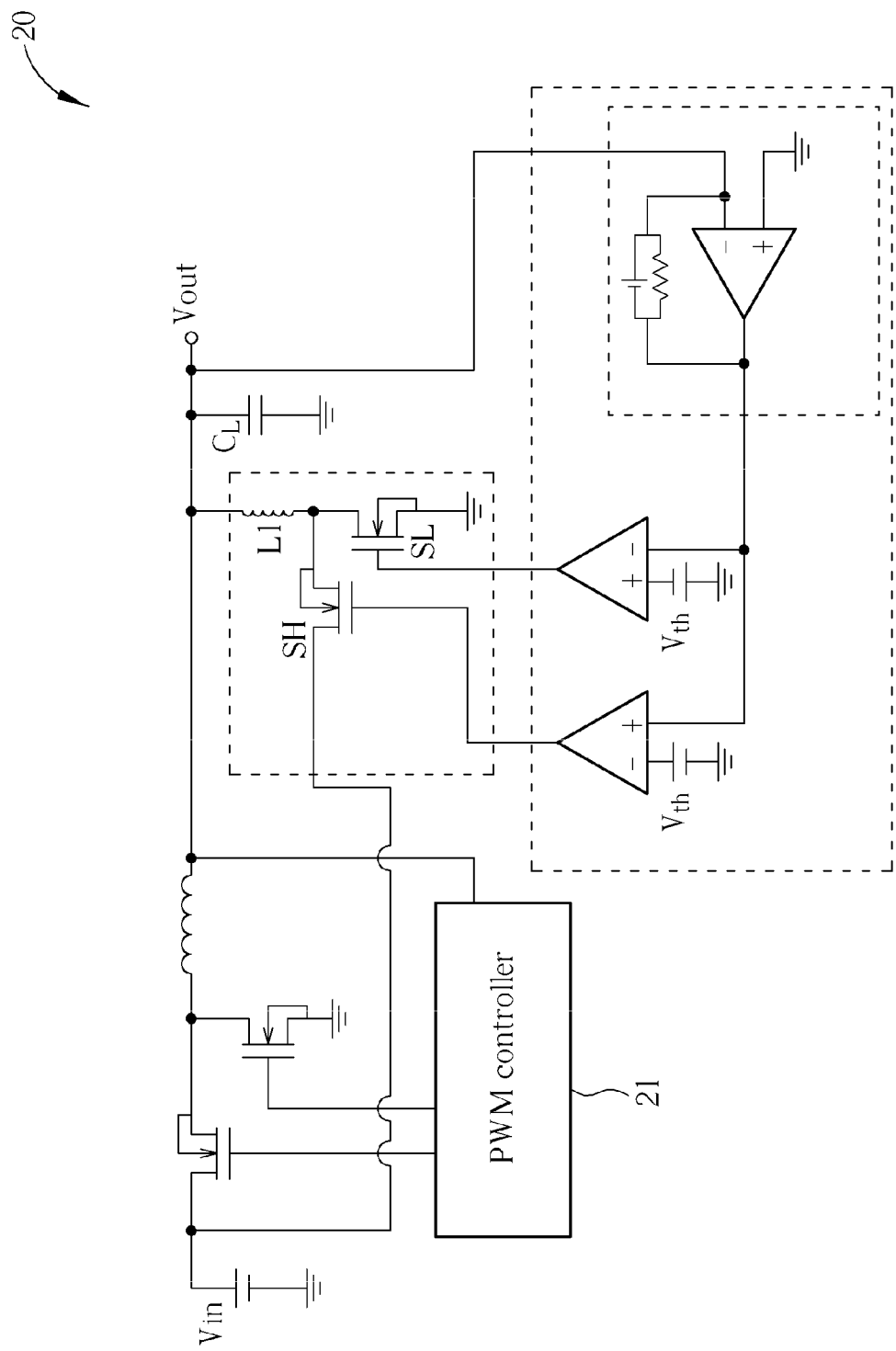
FIG. 2 is a schematic diagram of a conventional DC-DC buck converter.
Figure 3:
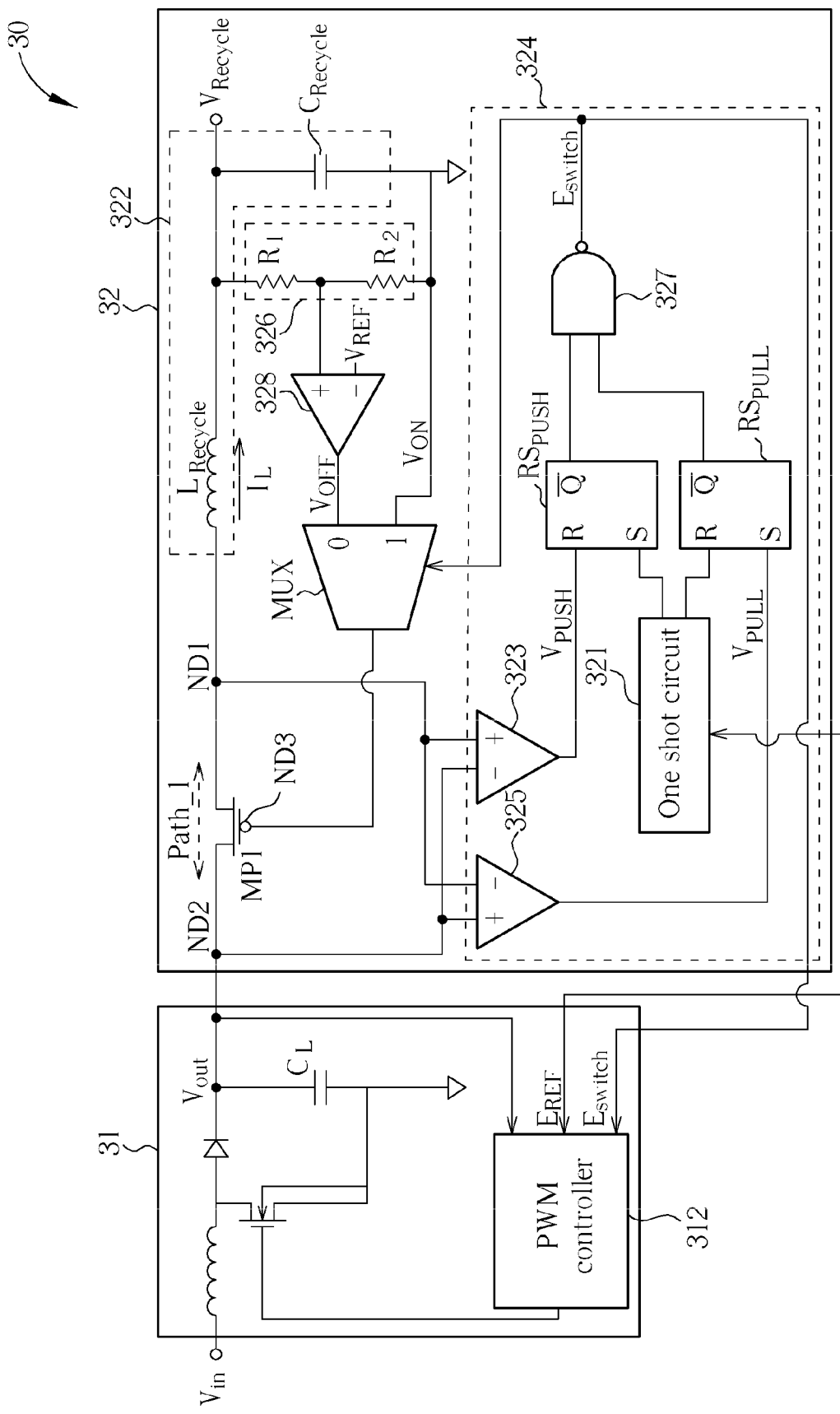
FIG. 3 is a schematic diagram of a power supply device according to an embodiment of the present invention.

Please refer to FIG. 3. FIG. 3 is a schematic diagram of a power supply device 30 according to an embodiment of the present invention. The power supply device 30 includes a DC-DC boost converter 31 and a charge recycling circuit 32. The DC-DC boost converter 31 is utilized for boosting an input voltage Vin to generate an output voltage Vout, and for switching a voltage level of the output voltage Vout according to a level switching signal $E_{REF}$. The charge recycling circuit 32 is coupled to the DC-DC boost converter 31, and is utilized for generating a current path Path_1 according to the level switching signal $E_{REF}$ to recycle redundant charges from the DC-DC boost converter 31 when the output voltage Vout is switched from high to low and to return stored charges back to the DC-DC boost converter 31 when the output voltage Vout is switched from low to high, so as to accelerate voltage switching of the output voltage Vout and to reduce power consumption of the DC-DC boost converter 31.

In addition, the charge recycling circuit 32 further includes an energy storage module 322, a multiplexer MUX, a power transistor MP1 and a control module 324. The multiplexer MUX is coupled to a turn-on voltage $V_{ON}$ and a turn-off voltage $V_{OFF}$, and is utilized for switching to output the turn-on voltage $V_{ON}$ and the turn-off voltage $V_{OFF}$ according to a control signal $E_{switch}$. Preferably, the power transistor MP1 is a P-channel metal-oxide semiconductor (MOS) transistor. The power transistor MP1 has a first end ND1 coupled to the energy storage module 322, a second end ND2 coupled to the DC-DC boost converter 31 and a control end ND3 coupled to the multiplexer MUX, and is utilized for generating the current path Path_1 by controlling electrical connection between the first end ND1 and the second end ND2 according to an output voltage of the multiplexer MUX. The control module 324 is coupled to the multiplexer MUX, the power transistor MP1 and the DC-DC boost converter 31, and is utilized for outputting a first logic level of the control signal $E_{switch}$ such as a high logic level, for example, according to the level switching signal $E_{REF}$, and for outputting a second logic level of the control signal $E_{switch}$, such as a low logic level, according to current passing though the current path Path_1 when the power transistor MP1 is turned on. The high logic level controls the multiplexer MUX to output the turn-on voltage $V_{ON}$, while the low logic level controls the multiplexer MUX to output the turn-off voltage $V_{OFF}$.

Thus, by use of the charge recycling circuit 32, when the output voltage Vout is switched from high to low by the DC-DC boost converter 31 according to the level switching signal $E_{REF}$, redundant charges of the DC-DC boost converter 31 can be recycled to the energy storage module 322 via the current path Path_1, and when the output voltage Vout is switched from low to high, the recycled charges stored in the energy storage module 322 can then be discharged to the DC-DC boost converter 31 via the current path Path_1 as well. As a result, the power supply device 30 not only can accelerate the voltage switching of the output voltage Vout, but also can significantly reduce the power consumption of the DC-DC boost converter 31.

Preferably, the energy storage module 322 is formed by a recycle inductor $L_{Recycle}$ and a recycle capacitor $C_{Recycle}$. The recycle inductor $L_{Recycle}$ is series-coupled to the first end ND1 of the power transistor MP1, and the recycle capacitor $C_{Recycle}$ is coupled between the recycle inductor $L_{Recycle}$ and a ground. In such a case, the charge recycling circuit 32 further includes a voltage divider 326 and a comparator 328. The voltage divider 326, composed of resistors R1 and R2, is coupled between the recycle capacitor $C_{Recycle}$ and the ground. The voltage divider 326 is utilized for performing voltage division operation on a voltage of the recycle capacitor $C_{Recycle}$. The comparator 328 has a positive input end coupled to the voltage divider 326 and a negative input end coupled to a reference voltage $V_{REF}$, and is utilized for comparing a voltage division result of the voltage divider 326 with the reference voltage $V_{REF}$ to generate the turn-off voltage $V_{OFF}$. The turn-on voltage $V_{ON}$ is coupled to the ground.

The control module 324 further includes an one shot circuit 321, latches $RS_{PUSH}$ and $RS_{PULL}$, comparators 323 and 325, and an NAND gate 327. The one shot circuit 321 is utilized for generating an one shot signal according to the level switching signal $E_{REF}$. The latches $RS_{PUSH}$ and $RS_{PULL}$ are preferred to be RS Latches, and have a set end, a reset end and an inverse output end, respectively. The set ends of the latches $RS_{PUSH}$ and $RS_{PULL}$ are coupled to the one shot circuit 321, and are utilized for receiving the one shot signal, respectively. The comparator 323 has a positive input end coupled to the first end ND1 of the power transistor MP1, a negative input end coupled to the second end ND2 of the power transistor MP1, and an output end coupled to the reset end of the RS latch $RS_{PUSH}$. Likewise, the comparator 325 has a positive input end coupled to the second end ND2 of the power transistor MP1, a negative input end coupled to the first end ND1 of the power transistor MP1, and an output terminal coupled to the reset end of the RS latch $RS_{PULL}$. The NAND gate 327 has a first input end coupled to the inverse output end of the RS latch $RS_{PUSH}$, a second input end coupled to the inverse output end of the RS latch $RS_{PULL}$, and an output end for outputting the control signal $E_{switch}$ to the multiplexer MUX.

As for detailed operation of the power supply device 30, please see the following illustration. Firstly, the control signal $E_{switch}$ is preset to be a low logic level, so that when the charge recycling circuit 32 is started up, the voltage of the recycle capacitor $C_{Recycle}$ can be raised to a specific voltage level such as a low voltage level V1 switched by the DC-DC boost converter 31, for example, by a feedback network formed by the voltage divider 326 and the comparator 328. Related operation is well known by those skilled in the art, and not narrated herein. It is noted that the division voltage of the voltage divider 326 is generally grater than the reference voltage $V_{REF}$ after the circuit is started up, and thus the turn-off voltage $V_{OFF}$ generated by the comparator 328 may be kept in a high voltage level for turning off the power transistor MP1 at most of time.

When the output voltage Vout is switched from a high voltage level V2 to the low voltage level V1 by the DC-DC boost converter 31 according to the level switching signal $E_{REF}$, an one shot signal is simultaneously generated by the one shot circuit 321 for triggering the RS latch $RS_{PUSH}$, so as to enable the NAND gate 327 to output a high logic level of the control signal $E_{switch}$. In such a situation, the operation of the DC-DC boost converter 31 is stopped, and the turn-on voltage $V_{ON}$ is outputted by the multiplexer MUX to turn on the power transistor MP1. At this time, since the voltage of the recycle capacitor $C_{Recycle}$ is smaller than the output voltage Vout, charges stored in the load capacitor $C_L$ would be immediately transferred to the recycle capacitor $C_{Recycle}$ via the current path Path_1 generated by the power transistor MP1, so as to accelerate the descending speed of the output voltage Vout. In addition, since inductors have characteristic of resisting current variation, the recycle inductor $L_{Recycle}$ is able to continuously draw out current from the load capacitor $C_L$ to the recycle capacitor $C_{Recycle}$ for storage of more energy even when the output voltage Vout is equal to the voltage of the recycle capacitor $C_{Recycle}$. Until the inductor current $I_L$ is decreased to 0, i.e. when the current direction is changed, a high logic level signal $V_{PUSH}$ is then outputted by the comparator 325 to the reset end of RS latch $RS_{PUSH}$ for enabling the NAND gate 327 to output the low logic level of the control signal $E_{switch}$. The charge recycle period is now completed, and the operation of the DC-DC boost converter 31 can be resumed to make the output voltage Vout stable.

Figure 4:
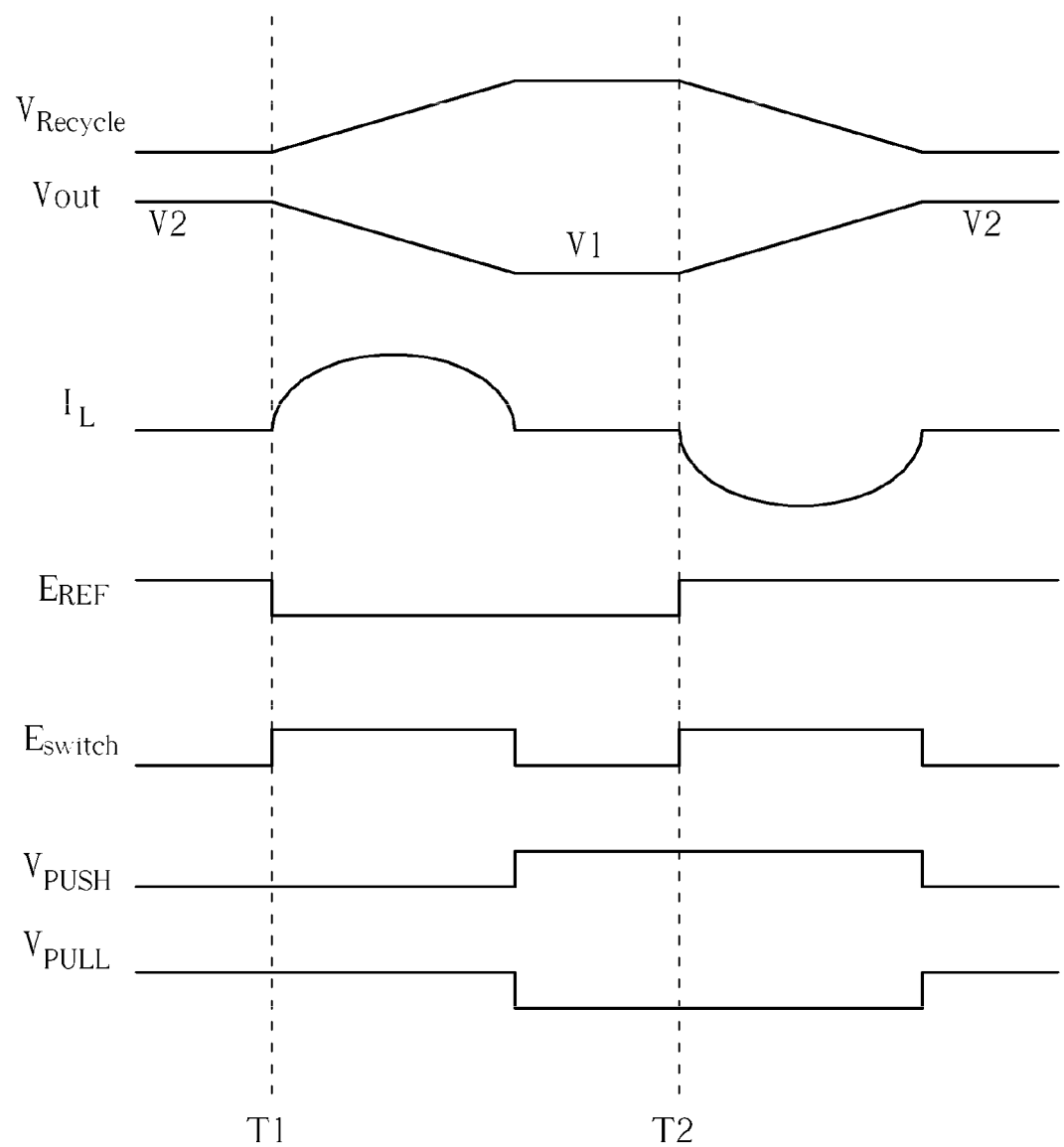
FIG. 4 shows related signal waveforms of the power supply device in FIG. 3.

On the other hand, when the output voltage Vout is switched from the low voltage level V1 to the high voltage level V2, the one shot circuit 321 is also triggered to generate an one shot signal to the set end of the RS latch $RS_{PULL}$ according to the level switching signal $E_{REF}$, so as to enable the NAND gate 327 to output the high logic level of the control signal $E_{switch}$. In such a situation, the operation of the DC-DC boost converter 31 is stopped, and the turn-on voltage $V_{ON}$ is outputted by the multiplexer MUX to turn on the power transistor MP1. At this time, since the voltage of the recycle capacitor $C_{Recycle}$ is greater than the output voltage Vout, the energy stored in the recycle capacitor $C_{Recycle}$ can then be discharged to the load capacitor $C_L$ via the current path Path_1 generated by the power transistor MP1, so as to efficiently increase the raising speed of the output voltage Vout. Also, since the inductors have characteristic of resisting current variation, the recycle inductor $L_{Recycle}$ is able to continuously extract charges from the recycle capacitor $C_{Recycle}$ to the load capacitor $C_L$ even when the output voltage Vout is equal to the voltage of the recycle capacitor $C_{Recycle}$. Until the inductor current $I_L$ is decreased to 0, i.e. when the current direction is changed, a high logic level signal $V_{PULL}$ is then outputted by the comparator 323 to the reset end of RS latch $RS_{PULL}$ for enabling the NAND gate 327 to output the low logic level of the control signal $E_{switch}$. So the charge recycle period is now completed, and the operation of the DC-DC boost converter 31 can be resumed to make the output voltage Vout stable. As for related signal waveforms of the power supply device 30, please refer to FIG. 4, in which T1 indicates a timing point when the output voltage Vout is switched from the high voltage level V2 to the low voltage level V1, and T2 indicates a timing point when the output voltage Vout is switched from the low voltage level V1 to the high voltage level V2.

Thus, by use of the charge recycling circuit 32, the redundant charges of the load capacitor $C_L$ can be recycled to the recycle capacitor $C_{Recycle}$ when the output voltage Vout of the DC-DC boost converter 31 is switched from high to low, and the recycled charges can be returned back to the load capacitor $C_L$ when the output voltage Vout is switched from low to high. As a result, in the embodiment of the present invention, the power supply device 30 not only can accelerate the voltage switching of the output voltage Vout, but also can significantly reduce the power consumption of the DC-DC boost converter 31.

Therefore, the power supply device 30 can be applied to any electronic apparatus that require fast output voltage switching capability, such as an LED (Light Emit Diode) backlight module of a color sequential liquid crystal display (LCD), and are not limited herein. As different color LEDs have different manufacture processes and materials, voltages needed to light up the different color LEDs are also different. For example, driving voltages of red LEDs are generally 18 Volts while those of green and blue LEDs are both 22.5 Volts. Thus, for implementation of the color sequential display on LCD panels, a power supply device that can boost the input voltage and fast switch the output voltage for driving the different color LEDs is required by the LED backlight module.

Figure 5:
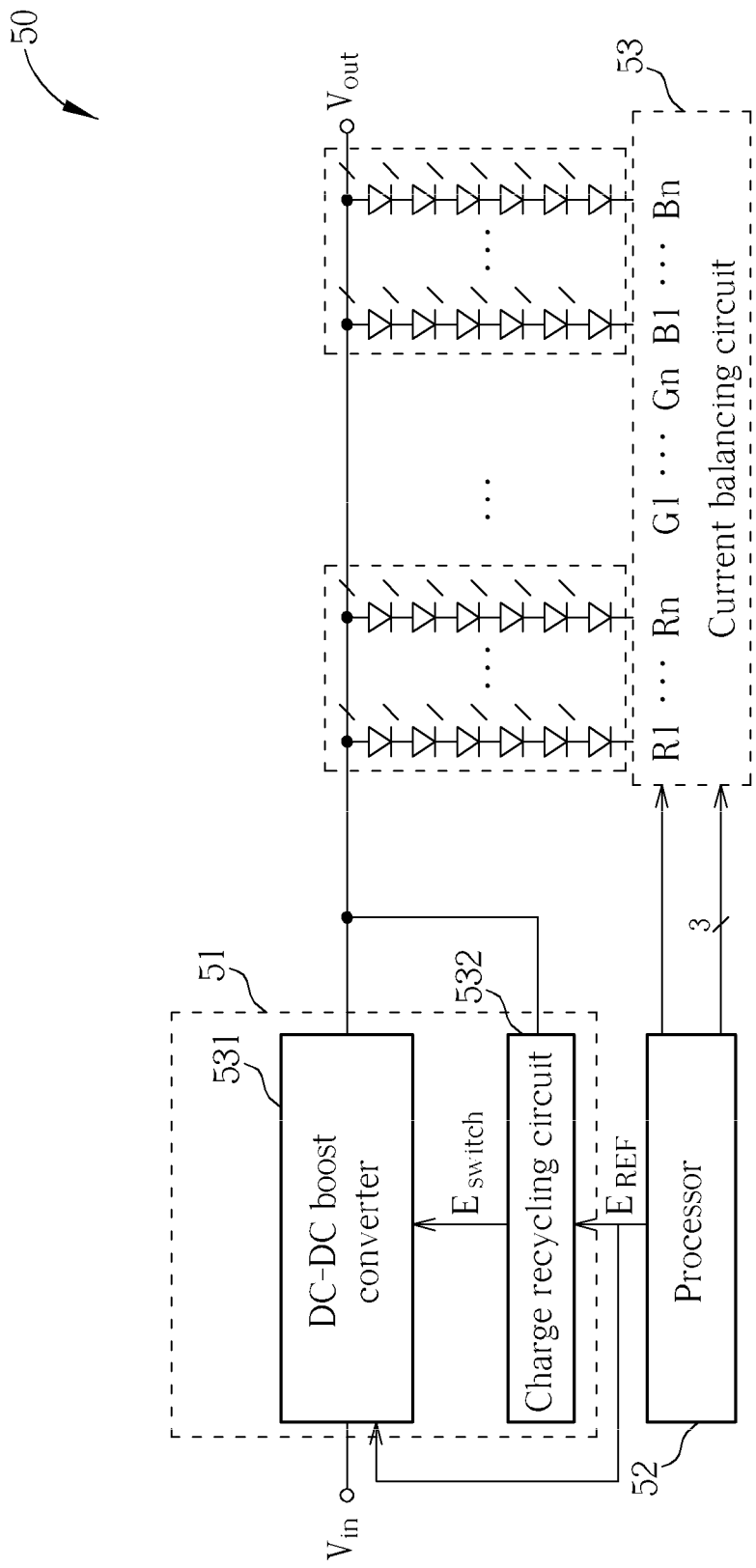
FIG. 5 is a schematic diagram of an LED backlight module according to an embodiment of the present invention.

For example, please refer to FIG. 5. FIG. 5 is a schematic diagram of an LED backlight module 50 according to an embodiment of the present invention. The LED backlight module 50 is applied to a color sequential LCD, and utilized for lighting up LEDs of the same color at one time. The LED backlight module 50 includes a power supply device 51, a processor 52, a current balancing circuit 53, red LED strings R1 to Rn, green LED strings G1 to Gn and blue LED strings B1 to Bn. Preferably, the power supply device 51 is realized by the power supply device 30 of FIG. 3, and further includes a DC-DC boost converter 531 and a charge recycling circuit 532.

When the LED backlight module 50 is about to light up the red LEDs (by low driving voltages) instead of lighting up the green or blue LEDs (by high driving voltages), the level switching signal $E_{REF}$ would be generated by the processor 52 to indicate the DC-DC boost converter 531 and to enable the operation of the charge recycling circuit 532 for accelerating the voltage switching of the output voltage Vout. In such a situation, the charge recycling circuit 532 would generate a current path to recycle redundant charges of the DC-DC boost converter 531 to a recycle capacitor (not shown in FIG. 5) during the time when the control signal $E_{Switch}$ is kept in a high logic level. Meanwhile, the operation of the DC-DC boost converter 531 is stopped.

Figure 6:
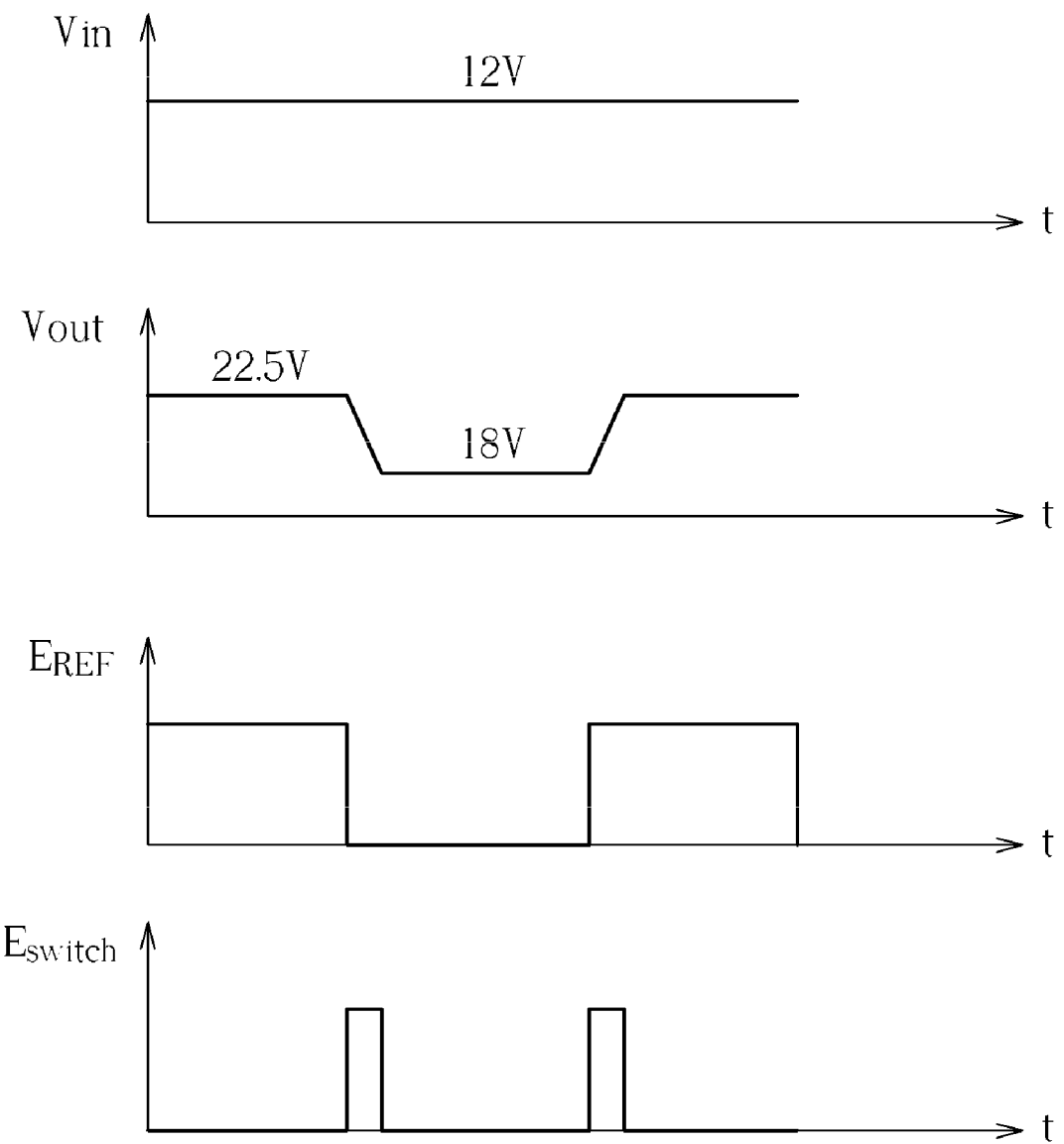
FIG. 6 shows related signal timing of the LED backlight module in FIG. 5.

Conversely, when the LED backlight module 50 is about to light up the green or blue LEDs (by the high driving voltages) instead of lighting up the red LEDs (by the low driving voltages), the level switching signal $E_{REF}$ is also generated by the processor 52 to indicate the DC-DC boost converter 531 and to enable the operation of the charge recycling circuit 532 for accelerating the voltage switching of the output voltage Vout. In such a situation, the charge recycling circuit 532 would also generate a current path to return the recycle charges back to the load capacitor of the DC-DC boost converter 531 during the time when the control signal $E_{switch}$ is kept in a high logic level. Meanwhile, the operation of the DC-DC boost converter 531 is stopped. As for related signal timing of the LED backlight module 50, please refer to FIG. 6.

Thus, by the power supply device 51, the voltage level of the driving voltages can be rapidly switched by the LED backlight module 50 to sequentially light up the different color LEDs, so that implementation of the color sequential display can be achieved.

As mentioned above, the present invention can accelerate the output voltage switching of the DC-DC converter by generating the additional current path, and can also reduce the power consumption by recycling the redundant charges.

Those skilled in the art will readily observe that numerous modifications and alterations of the device and method may be made while retaining the teachings of the invention.

What is claimed is:

1. A power supply device with fast output voltage switching capability comprising:
    a DC-DC boost converter for boosting an input voltage to generate an output voltage and for switching a voltage level of the output voltage according to a level switching signal; and
    a charge recycling circuit, coupled to the DC-DC boost converter, for generating a current path according to the level switching signal to recycle redundant charges from the DC-DC boost converter when the output voltage is switched from high to low and to return stored charges back to the DC-DC boost converter when the output voltage is switched from low to high, so as to accelerate voltage switching of the output voltage and to reduce power consumption of the DC-DC boost converter, the charge recycling circuit comprising:
    an energy storage module;
    a multiplexer, coupled to a turn-on voltage and a turn-off voltage, for switching to output the turn-on voltage and the turn-off voltage according to a control signal;
    a power transistor, having a first end coupled to the energy storage module, a second end coupled to the DC-DC boost converter and a control end coupled to the multiplexer, the power transistor controlling electrical connection between the first end and the second end to form the current path according to an output voltage of the multiplexer; and
    a control module, coupled to the multiplexer, the power transistor and the DC-DC boost converter, for outputting a first logic level of the control signal according to the level switching signal to control the multiplexer to output the turn-on voltage and for outputting a second logic level of the control signal according to current magnitude on the current path when the power transistor is turned on to control the multiplexer to output the turn-off voltage.

2. The power supply device of claim 1, wherein the DC-DC boost converter is disabled when the first logic level of the control signal is outputted by the control module.

3. The power supply device of claim 1, wherein the energy storage module comprises:
 a recycle inductor, having a first end and a second end, the first end coupled to the first end of the power transistor; and
 a recycle capacitor, having a first end and a second end, the first end coupled to the second end of the recycle inductor, the second end coupled to a ground.

4. The power supply device of claim 3, wherein the charge recycling circuit further comprises a feedback module, coupled to the recycle capacitor and the multiplexer, for generating the turn-off voltage according to an output voltage of the recycle capacitor.

5. The power supply device of claim 4, wherein the feedback module comprises:
 a voltage divider, coupled between the first end of the recycle capacitor and the ground, for performing voltage division operation on the output voltage of the recycle capacitor; and
 a comparator, having a positive input end coupled to the voltage divider and a negative input end coupled to a reference voltage, for comparing a voltage division result of the voltage divider with the reference voltage to generate the turn-off voltage.

6. The power supply device of claim 4, wherein the control signal is preset to be the second logic level for keeping the output voltage of the recycle capacitor in a specific level when the charge recycling circuit is started up.

7. The power supply device of claim 1, wherein the turn-on voltage is coupled to a ground.

8. The power supply device of claim 1, wherein the power transistor is a P-channel metal-oxide semiconductor (MOS) transistor.

9. The power supply device of claim 1, wherein the control module comprises:
 an one shot circuit for generating an one shot signal according to the level switching signal;
 a first latch, having a set end, a reset end and an inverse output end, the set end, coupled to the one shot circuit, receiving the one shot signal;
 a second latch, having a set end, a reset end and an inverse output end, the reset end, coupled to the one shot circuit, receiving the one shot signal;
 a first comparator, having a positive input end coupled to the first end of the power transistor, a negative input end coupled to the second end of the power transistor, and an output end coupled to the reset end of the first latch;
 a second comparator, having a positive input end coupled to the second end of the power transistor, a negative input end coupled to the first end of the power transistor, and an output end coupled to the reset end of the second latch; and
 an NAND gate, having a first input end coupled to the inverse output end of the first latch, a second input end coupled to the inverse output end of the second latch, and an output end for outputting the control signal to the multiplexer.

10. The power supply device of claim 9, wherein the first latch and the second latch are RS Latches, respectively.

11. The power supply device of claim 1, wherein the power supply device is applied to an LED (Light Emit Diode) backlight module of a color sequential liquid crystal display.

12. The power supply device of claim 11, wherein the level switching signal is generated by the LED backlight module for driving LEDs of different colors.

* * * * *